United States Patent [19]

Coleman et al.

[11] Patent Number: 5,733,033
[45] Date of Patent: Mar. 31, 1998

[54] NOVELTY CANDY HOLDING DEVICE WITH A SOUND MAKING DEVICE AND LIGHT DEVICE

[76] Inventors: Thomas J. Coleman, 19170 Paddock Pl., Abingdon, Va. 24211; William K. Schlotter, IV, 505 Windridge Dr., Stafford, Va. 22554; Princess Ann Coleman, 19170 Paddock Pl., Abingdon, Va. 24211; Ann M. Schlotter, 505 Windridge Dr., Stafford, Va. 22554

[21] Appl. No.: 707,006

[22] Filed: Sep. 3, 1996

[51] Int. Cl.⁶ ............................................. F21V 33/00
[52] U.S. Cl. ...................... 362/109; 362/86; 362/208; 362/253; 362/806
[58] Field of Search ........................... 362/86, 109, 157, 362/190, 202, 205, 208, 253, 806

[56] References Cited

U.S. PATENT DOCUMENTS

| 4,914,748 | 4/1990 | Schlotter, IV et al. | 362/109 |
| 5,471,373 | 11/1995 | Coleman et al. | 362/109 |

Primary Examiner—Stephen F. Husar

[57] ABSTRACT

A novelty candy holding device in combination with a sound making device and a light device. The device includes a housing including a switch controlled power source which operates an integrated circuit that produces different sounds via a speaker connected to the integrated circuit. A light is secured to the speaker circuit so that the light flashes as the speaker makes different sounds. A candy sucker is secured to the upper end of the housing for consumption as the speaker makes different sounds in accordance with operation of different switches.

14 Claims, 3 Drawing Sheets

NOVELTY CANDY HOLDING DEVICE WITH A SOUND MAKING DEVICE AND LIGHT DEVICE

BACKGROUND OF THE INVENTION

This invention is directed to a novelty candy holding device which includes a sound making means and a light means.

PRIOR ART

Heretofore a candy sucker has been used with a candy sucker rotating means, a music making device in combination with a sucker, A flash light which shines through a piece of hard candy to make different colored light beams. A candy holding device in combination with a reservoir which contains a solution that is directed over a candy sucker via an aperture in the candy sucker stick and candy sucker.

SUMMARY OF THE INVENTION

This invention sets forth a candy pop which is secured to one end of a housing for consumption by a user. The candy pop is held in place by a candy pop stick and the housing contains a battery source, an intergrated circuit with various functions controlled by different switches. A light bulb is operated to flash as a sound or some operation is activated by the intergrated circuit.

It is therefore an object to provide in combination a candy sucker and a housing containing an integrated circuit (I.C.) which is controlled by different switches to produce different sounds.

Another object is to provide a light bulb which produces light flashes as the sounds are produced.

Still another object is to provide in combination a candy sucker and an I.C. which can produce different sounds in accordance with different control switches for each of the different sounds.

Yet another object is to provide a light bulb which is activitated to form flashes in accordance with the sounds produced.

Other objects and features of the invention will become obvious from an understanding of the invention when viewed in accordance with the description and drawings.

DETAILED DESCRIPTION

Figure 1:
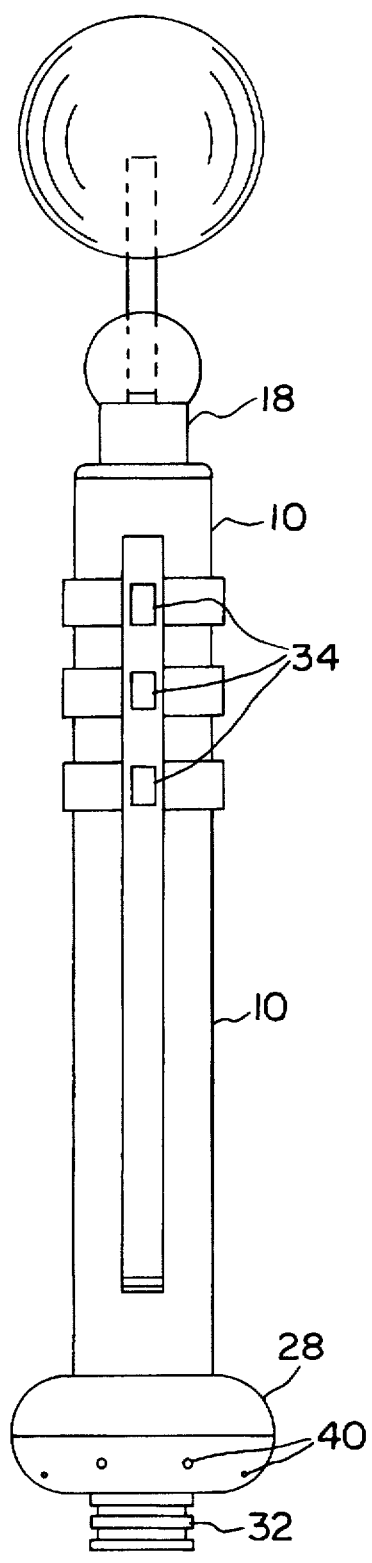
FIG. 1 illustrates a side view with the device shown in an up-right view.

In the drawings and description, like parts will be designated by like reference characters. FIG. 1 illustrates a side view of the device in an upright position. The device includes a housing 10 which can be made of any suitable material and of any desired shaped such as of plastic, suitable paper material or any other suitable material. The housing is shown as a cylinder. The upper end of the housing is provided with a female thread 12 to which a cap 14 is secured by a male thread 16. The cap is shown with a middle section 18 and an end 20 which is somewhat spherical. The end 20 is provided with an aperture 22 which has a diameter of sufficient size to secure one end of a sucker stick 24 tightly within the aperture. A candy sucker 26 is shown secured onto the opposite end of the sucker stick.

The lower end of the housing is provided with a lower end cap 28 which is made in two pieces as shown in FIG. 1 and includes therein a speaker 30, and a light bulb cover 32 which protects a light bulb 33. The device is provided with carbon tip switches 34 which control various circuits of an integrated circuit board 36 by use of a power supply 38 which is shown as two batteries. The speaker cover is provided with a plurality of apertures 40. The power supply 38, I.C. board 36, speaker 30 and bulb 33 are not shown in FIG. 1 for clarification of the drawings.

Figure 3:
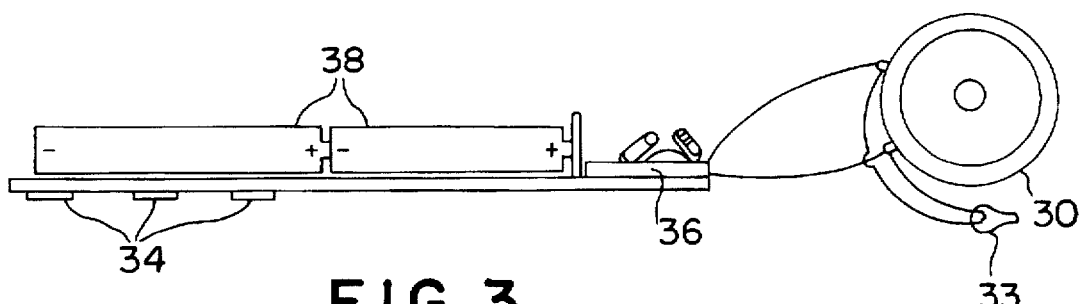
FIG. 3 is a side view of the operative parts.
Figure 4:
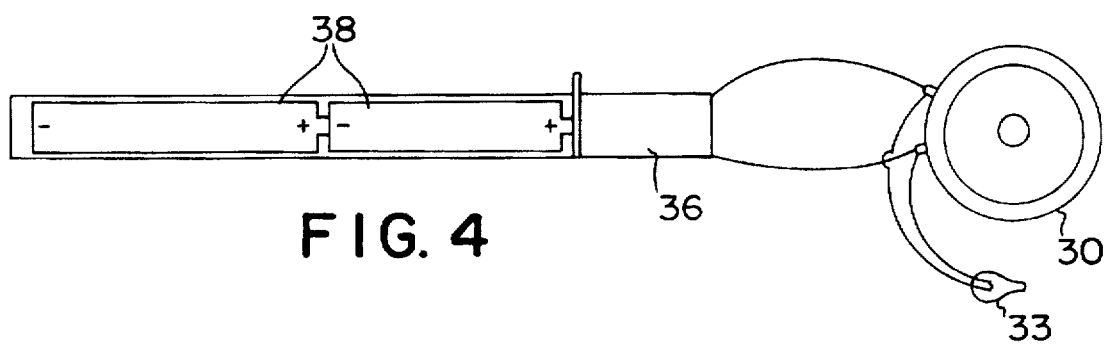
FIG. 4 is a top view of the operative parts.
Figure 5:
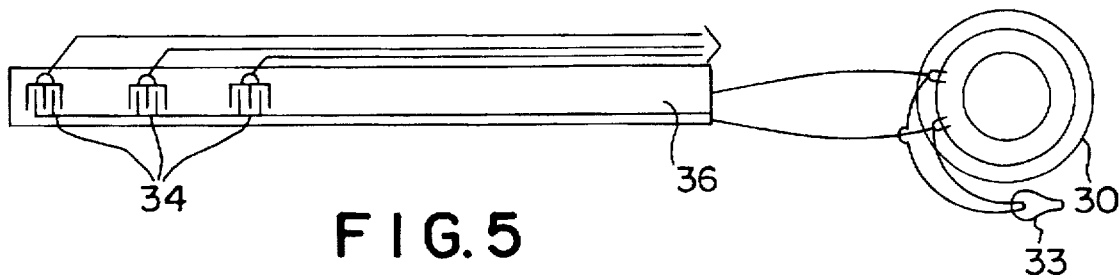
FIG. 5 is a bottom view of the operative parts.

FIG. 3–5 illustrates different views of the power supply 38, switches 34, I.C. board 36, light bulb 33 and speaker 30 which are not shown by dotted lines within FIG. 1. The I.C. board is a sound producing Y8085 type and the speaker is a 8 ohm 0.75 watt, one to two inches in diameter.

Figure 6:
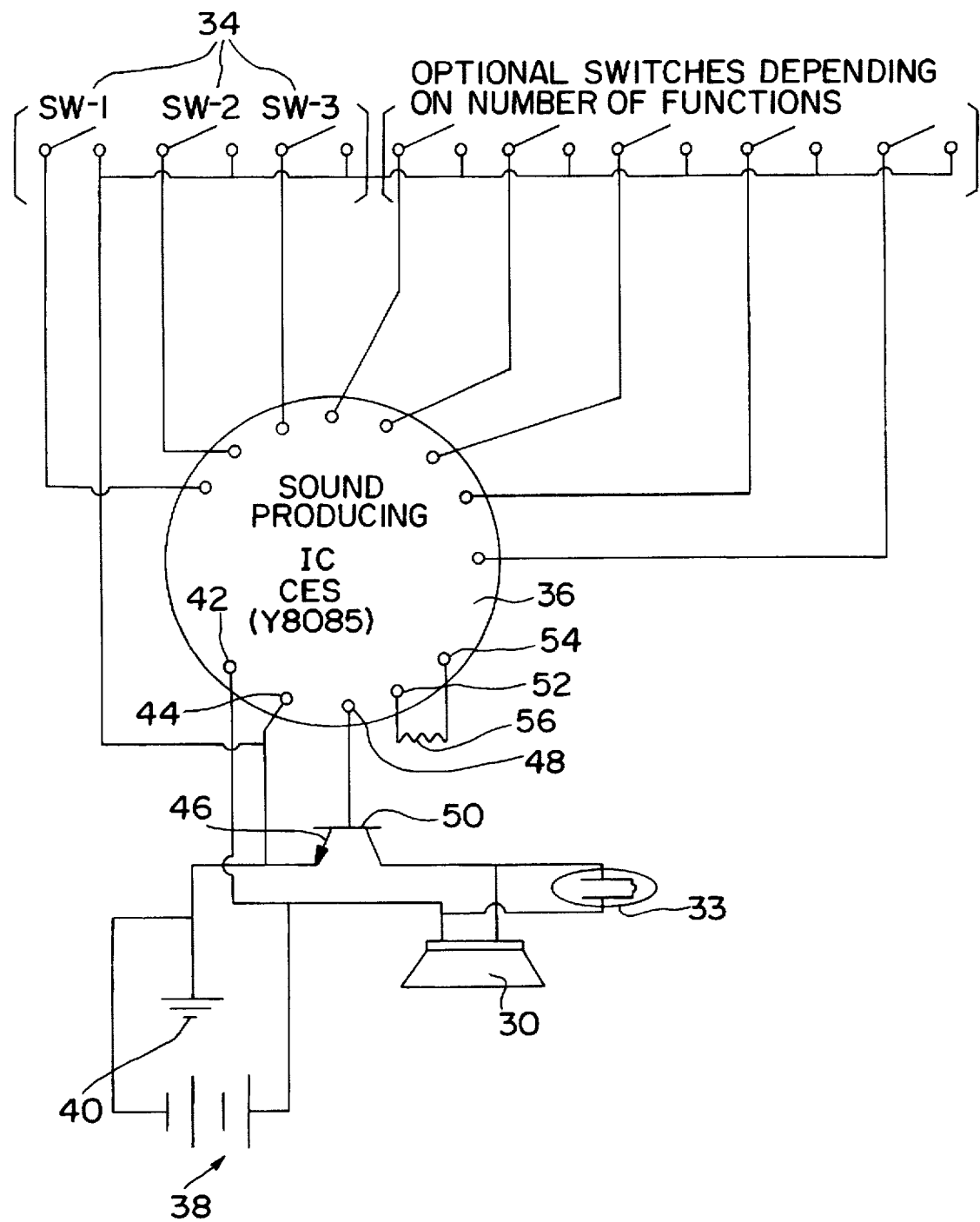
FIG. 6 is a view illustrating the integrated circuit, the controls and the electrical circuitry for the operative parts.

FIG. 6 illustrates the switches 34, I.C. board 36, power supply 38, speaker 30, bulb 33 and the rest of the control circuit. The control circuit includes carbon tipped switches which can be any number depending on the number of functions set forth by the I.C. board. One side of the switches are connected to ground 40 via suitable electrical lines. The opposite side of the different switches are connected to the I.C. board contacts, one for each of the switches for controlling each different function. More than three functions are shown. Contacts opposite from the switch contacts are connected in order from the left side toward the right side. As shown, the first contact 42, connects with the positive side of the power source, the speaker and the bulb. The next contact 44 connects with ground and to an emitter 46 of an 8050-1 MC transitor. The next contact 48 is connected to the base 50 of the transitor and the collector of the transister is connected to the opposite side of the bulb 33 and the speaker 30. The next two contacts 52, 54 are connected to opposite sides of a 100K ohm resistor 56.

Figure 2:
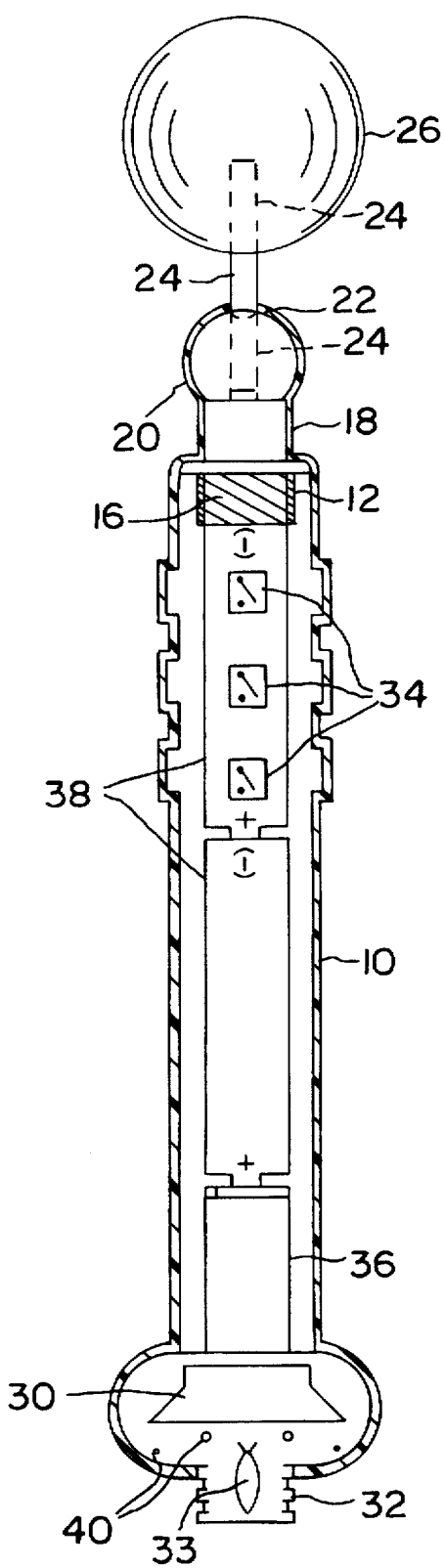
FIG. 2 is a partial cross sectional view illustrating the various parts.

In operation the various components are assembled within the housing 10 as shown in FIG. 2 and connected electrically such as shown in FIG. 6. The I.C. board is loaded with any desired electronic sound, phazer sound, robotic sound, emergency sounds such as a siren or can include remarks by a person.

The different switches will control one of the sounds when pushed to complete a circuit. The sound will be produced by the speaker and as the sounds are produced by the speaker the bulb will flash different flashes which represent the sound.

The housing is made of any suitable material without any sharp edges which may injure a user. Also, the housing end that incloses the speaker is made of two pieces so that it can be taken apart for assembly of the speaker and the bulb. Further the housing can be opened at the upper end so that the circuit batteries etc. can be assembled within the housing. It would be obvious to one skilled in the art that the housing could be made into two parts longitudinally so that the different parts can be assembled within the housing.

It would also be obvious to one skilled in the art that a different type speaker, I.C. board, transitor and resistor could be used without departing from the invention. These parts have been set forth as illustrative examples. The system operates to make a different sound by operation of a different switch.

What is claimed is:

1. A novelty candy holding device in combination with a sound making and light producing device which comprises a housing 10, said housing having a first axial aperture, an upper end enclosure, a bottom end enclosure, said upper end enclosure including a supporting means for a piece of candy, said bottom end enclosure enclosing a speaker (30) and a light producing means (33), an enclosure extending from said bottom enclosure for enclosing said light producing means, a power source within said housing, switch means for operating said power source, an integrated circuit board within said housing, means for connecting said power source, said switch means, said speaker and said light producing means to said integrated circuit for producing different sounds via said speaker.

2. A novel candy holding device as set forth in claim 1; in which, said power source includes at least one battery.

3. A novel candy holding device as set forth in claim 1; in which, said power source includes a plurality of batteries.

4. A novel candy holding device as set forth in claim 1; in which, said switch means includes at least one switch.

5. A novel candy holding device as set forth in claim 1; in which, said switch means includes a plurality of switches.

6. A novel candy holding device as set forth in claim 5; in which, said power source includes a plurality of batteries.

7. A novel candy holding device as set forth in claim 1; in which said supporting means includes a second axial aperture, a candy sucker on a candy sucker stick and said candy sucker stick is secured in said second axial aperture in said supporting means included by said upper end enclosure.

8. A novel candy holder device as set forth in claim 7; in which said bottom end of said housing includes at least two sections.

9. A novel candy holding device as set forth in claim 1; in which said bottom end of said housing includes at least one aperture.

10. A novel candy holding device as set forth in claim 8; in which said bottom end of said housing includes at least one aperture.

11. A novel candy holding device as set forth in claim 7; in which said upper end enclosure is secured to said housing by screw threads.

12. A novel candy holding device as set forth in claim 8; in which said upper end enclosure is secured to said housing by screw threads.

13. A novel candy holding device as set forth in claim 9; in which said upper end enclosure is secured to said housing by screw threads.

14. A novel candy holding device as set forth in claim 1; in which said light producing means is connected with said speaker and flashes as said speaker produces different sounds.

* * * * *